United States Patent
Kobayashi et al.

(10) Patent No.: US 7,167,618 B2
(45) Date of Patent: Jan. 23, 2007

(54) OPTICAL MODULE HAVING STACKED GUIDE SUBSTRATES AND METHOD FOR ASSEMBLING THE SAME

(75) Inventors: Fumitoshi Kobayashi, Osaka (JP); Kenichi Nakama, Osaka (JP)

(73) Assignee: Nippon Sheet Glass Company, Limited, Osaka (JP)

( * ) Notice: Subject to any disclaimer, the term of this patent is extended or adjusted under 35 U.S.C. 154(b) by 28 days.

(21) Appl. No.: 10/478,895

(22) PCT Filed: May 21, 2002

(86) PCT No.: PCT/JP02/04877

§ 371 (c)(1),
(2), (4) Date: Nov. 24, 2003

(87) PCT Pub. No.: WO02/095464

PCT Pub. Date: Nov. 28, 2002

(65) Prior Publication Data

US 2004/0170353 A1 Sep. 2, 2004

(30) Foreign Application Priority Data

May 23, 2001 (JP) .............................. 2001-153353

(51) Int. Cl.
*G02B 6/04* (2006.01)
*G02B 6/06* (2006.01)

(52) U.S. Cl. ...................................... 385/115; 385/116

(58) Field of Classification Search .................. 385/31, 385/33, 39, 51–53, 76–78, 80, 81, 88–91, 385/136, 137, 115, 116
See application file for complete search history.

(56) References Cited

U.S. PATENT DOCUMENTS 4,812,002 A * 3/1989 Kato et al. ..................... 385/33
6,361,718 B1 3/2002 Shimmo et al.

(Continued)

FOREIGN PATENT DOCUMENTS

JP 55-48708 A 4/1980

(Continued)

OTHER PUBLICATIONS

International Search Report, Aug. 20, 2002.

*Primary Examiner*—Frank G. Font
*Assistant Examiner*—Derek L. Dupuis
(74) *Attorney, Agent, or Firm*—RatnerPrestia (57) ABSTRACT

An optical module is provided in which the angles of the optical fibers to be inclined with respect to the planar microlens array may be regulated at the same time when respective optical axes of the microlenses and respective optical fibers are passively aligned. The optical module of the present invention comprises a planar microlens array having a plurality of microlenses formed in one surface thereof, a planar fitting transparent substrate having a plurality of micro fitting recesses formed in one surface thereof, a planar first guide plate having a plurality of micro guide holes opened therethrough, a planar second guide plate having a plurality of micro guide holes opened therethrough, and a plurality of optical fibers each end thereof having a micro fitting convex portion.

16 Claims, 8 Drawing Sheets

U.S. PATENT DOCUMENTS

| | | | |
|---|---|---|---|
| 6,393,187 B1* | 5/2002 | Engelberth et al. | 385/115 |
| 6,530,554 B1 | 3/2003 | Shimmo et al. | |
| 6,766,076 B1* | 7/2004 | Nakama et al. | 385/33 |
| 6,850,666 B1* | 2/2005 | Hikichi et al. | 385/31 |
| 2002/0114566 A1* | 8/2002 | Fairchild et al. | 385/33 |
| 2002/0131703 A1* | 9/2002 | Velikov | 385/35 |
| 2003/0150839 A1* | 8/2003 | Kobayashi et al. | 216/97 |
| 2004/0052494 A1* | 3/2004 | Kobayashi | 385/137 |
| 2004/0165822 A1* | 8/2004 | Kobayashi et al. | 385/33 |

FOREIGN PATENT DOCUMENTS

| | | | |
|---|---|---|---|
| JP | 63-226607 | | 9/1988 |
| JP | 2-123301 A | | 5/1990 |
| JP | 2123301 | * | 5/1990 |
| JP | 04-288507 | * | 10/1992 |
| JP | 5-333232 A | | 12/1993 |
| JP | 2000-266965 A | | 9/2000 |
| JP | 2000266965 | * | 9/2000 |
| JP | 2001-9843 A | | 1/2001 |
| WO | WO 99/39890 | | 8/1999 |

* cited by examiner

F I G. 1

PRIOR ART

OPTICAL MODULE HAVING STACKED GUIDE SUBSTRATES AND METHOD FOR ASSEMBLING THE SAME

TECHNICAL FIELD

The present invention generally relates to an optical module, particularly to an optical module which is densely space-division multiplexed by using a microlens array, and a method for assembling the optical module.

BACKGROUND ART

Figure 1:
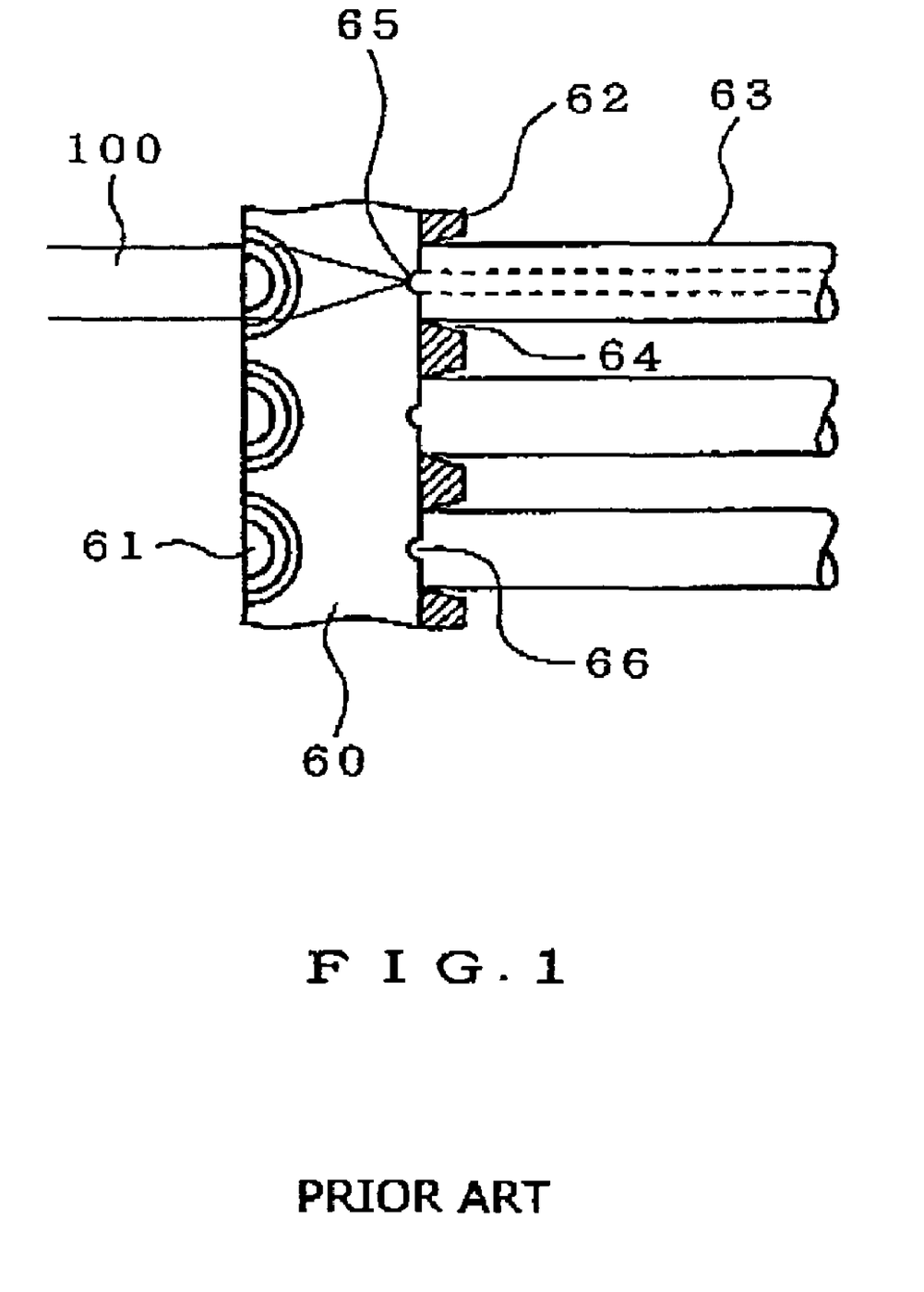
FIG. 1 shows a structure of a conventional optical module.

A conventional optical module of this type has been disclosed in Japanese patent No. 2719804, for example. This conventional optical module comprises, as shown in FIG. 1, a planar microlens array 60 consisting of a planar transparent substrate having microlenses 61 formed in a surface thereof. Fitting recesses 65 are formed in a surface opposite to the lens-formed surface of the array 60, each of recesses 65 being aligned with the center of a corresponding microlens 61. An optical element to be optically coupled to the microlens 61 is an optical fiber 63, for example. The end core portion of an optical fiber is processed by a selective etching to form a micro fitting convex portion 66. According to the conventional optical module described above, an alignment can easily be conducted by inserting the convex portion 66 of an optical fiber into the fitting recess 65 to fix it thereto, instead of an active alignment (i.e., light is guided into an optical fiber and the position of the optical fiber is regulated so as to maximize light coupled to a microlens).

The conventional optical module described above causes the following problems in such a case that the optical module is used to combine especially with a planar optical element. That is, when the planar optical element is a planar transmission optical element module such as a liquid crystal switch, a microlens optical system must be constructed by a collimate optical system having an infinite conjugate ratio. FIG. 1 shows a microlens optical system constructed described above in which collimated light 100 exits from a microlens. On the other hand, in an optical module for connecting a light-emitting element such as a laser array to an optical fiber, a microlens optical system thereof is required to be constructed by a reducing image optical system having a finite conjugate rate. It should be noted that the conjugate ratio means the ratio of an object distance to an image distance.

In the case of an optical module coupled to optical fibers, a microlens optical system is required to be constructed by a unity magnification image optical system, while in the case of an optical module coupled to a planar optical element such as a photo-detector array having a light-receiving area larger than a mode field diameter of an optical fiber, a microlens optical system is required to be constructed by a magnification image optical system.

In order to satisfy these requirements, planar microlens arrays each having a different focal length of microlens are prepared separately so that an optimal conjugate ratio may be obtained for respective application in the conventional optical module, or the thickness of a substrate of planar microlens array is regulated to obtain an optimal conjugate ratio. As a result, the number of kinds of planar microlens arrays will be increased. Also, when the optical characteristic of an optical module is regulated in an experimental environment for example, it is often required to remake a planar microlens array. In such a case, an efficient development and early implementation of optical modules will be disturbed.

As an optical module in which the problems described above have been resolved, the applicant has already proposed an optical module comprising a planar transparent substrate for adjusting a conjugate ratio provided between a planar microlens array and a guide substrate for optical fibers.

Figure 2:
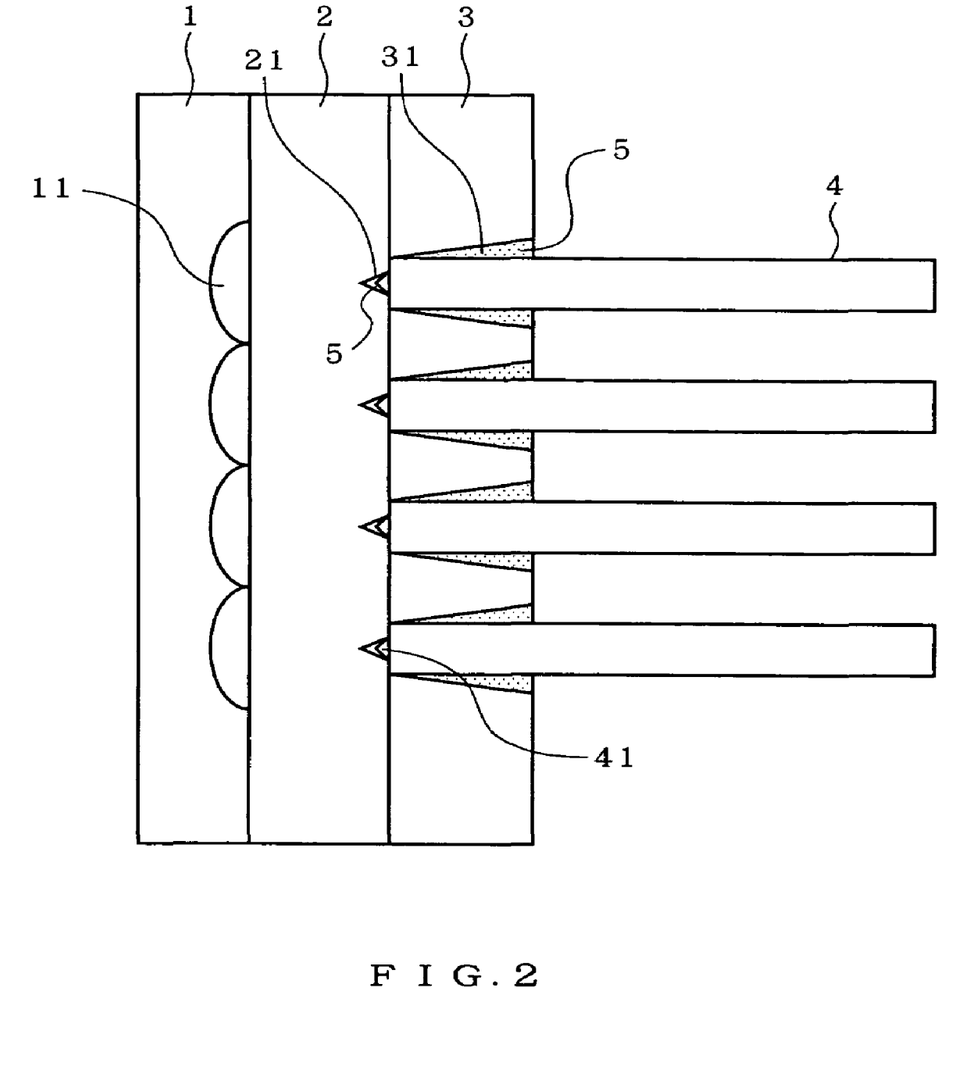
FIG. 2 shows a structure of a proposed optical module.

Such a proposed optical module is shown in FIG. 2. The optical module comprises a planar microlens array 1, a transparent substrate 2 for adjusting a conjugate ratio of the optical module, a guide substrate 3 for optical fibers, and a plurality of optical fibers 4. The planar microlens array 1 consists of a planar transparent substrate, in one surface thereof a plurality of circular microlenses 11 are formed and arrayed. The transparent substrate 2 includes a plurality of micro fitting recesses 21 formed and arrayed in one surface thereof. The guide plate 3 includes a plurality of tapered micro guide holes 31 opened therethrough. The end core portion of each optical fiber 4 is exposed convexly to form a micro fitting convex portion 41. In the figure, reference numeral 5 designates adhesive, an index of refraction thereof being matched to that of the transparent substrate and guide plate.

In the conventional optical module shown in FIG. 1 and the optical module shown in FIG. 2, while a plurality of optical fibers may be aligned to respective microlenses, it is difficult to position all of the optical fibers perpendicularly to the planar microlens array.

If an optical fiber may not be positioned perpendicularly to the planar microlens array, the problem is caused such that a coupling efficiency is degraded. Especially, the effect of degradation of a coupling efficiency is remarkable in the case that the microlens optical system is constructed by a unity magnification optical system.

There are also some cases that all of optical fibers are required to be positioned to a planar microlens array with a predetermined angle inclined to the microlens array.

DISCLOSURE OF INVENTION

Accordingly, an object of the present invention is to provide an optical module wherein all of optical fibers are positioned perpendicularly or inclined at a predetermined angle to a planar microlens array.

Another object of the present invention is to provide a method for assembling the optical module described above.

Therefore, a first aspect of the present invention is an optical module comprising a planar microlens array having a plurality of microlenses formed in at least one surface thereof; a planar fitting transparent substrate, one surface thereof being adhered to one surface of the planar microlens array, and a plurality of micro fitting recesses being formed in the other surface thereof with the center of each recess being aligned to the center of each microlens; and a plurality of guide substrates for optical fibers stacked and adhered to each other, the stacked guide substrates being adhered to the other surface of the fitting transparent substrate, each of the guide substrates having a plurality of tapered micro guide holes opened therethrough with opposing guide holes being aligned to each other, and each guide hole being aligned to a corresponding recess.

The optical module further comprises a plurality of optical fibers each having a micro fitting convex portion consisting of an exposed end core portion of each of optical fibers, wherein each of the optical fibers is inserted through the opposing guide holes to be fitted into the corresponding recess.

The guide substrates are stacked in such a manner that the opposing micro guide holes are coaxially positioned to cause all of the optical fibers to be perpendicular to the fitting transparent substrate, or in such a manner that the opposing guide holes are relatively shifted to cause all of the fibers to be inclined to the fitting transparent substrate.

A second aspect of the present invention is an optical module comprising a planar microlens array having a plurality of microlenses formed in one surface thereof and a plurality of micro fitting recesses formed in the other surface thereof with the center of each recess being aligned to the center of each microlens; and a plurality of guide substrates for optical fibers stacked and adhered to each other, the stacked guide substrates being adhered to the other surface of the planar microlens array, each of the guide substrates having a plurality of tapered micro guide holes opened therethrough with opposing guide holes being aligned to each other, and each guide hole being aligned to a corresponding recess.

The optical module further comprises a plurality of optical fibers each having a micro fitting convex portion consisting of an exposed end core position of each of the optical fibers, wherein each of the optical fibers is inserted through the opening guide holes to be fitted into the corresponding recess.

The guide substrates are stacked in such a manner that the opposing micro guide holes are coaxially positioned to cause all of the optical fibers to be perpendicular to the planar microlens array, or in such a manner that the opposing guide holes are relatively shifted to cause all of the fibers to be inclined to the planar microlens array.

A third aspect of the present invention is a method for assembling an optical module comprising the steps of: preparing a planar microlens array having a plurality of microlenses formed in at least one surface thereof; adhering one surface of the planar microlens array to one surface of a planar fitting transparent substrate, the planar fitting transparent substrate having a plurality of micro fitting recesses formed in the other surface thereof, in such a manner that the center of each recess is aligned to the center of each microlens, stacking and adhering a plurality of guide substrates for optical fibers to each other, each of the guide substrates having a plurality of micro guide holes opened therethrough with each guide hole being aligned to the center of a corresponding recess; and adhering the stacked guide substrates to the other surface of the fitting transparent substrate.

According to the method for assembling an optical module, the guide substrates are stacked and adhered in such a manner that opposing micro guide holes of respective guide substrates are coaxially positioned, or in such a manner that opposing micro guide holes of respective guide substrates are relatively shifted.

A fourth aspect of the present invention is a method for assembling an optical module comprising the steps of preparing a planar microlens array having a plurality of microlenses formed in one surface thereof and a plurality of micro fitting recesses formed in the other surface thereof with the center of each recess being aligned to the center of each microlens; stacking and adhering a plurality of guide substrates for optical fibers to each other, each of the guide substrates having a plurality of micro guide holes opened therethrough with each guide hole being aligned to the center of a corresponding recess; and adhering the stacked guide substrates to the other surface of the planar microlens array.

According to the method for assembling an optical module, the guide substrates are stacked and adhered in such a manner that opposing micro guide holes of respective guide substrates are coaxially positioned, or in such a manner that opposing micro guide holes of respective guide substrates are relatively shifted.

BEST MODE FOR CARRYING OUT THE INVENTION

First Embodiment

Figure 3A:
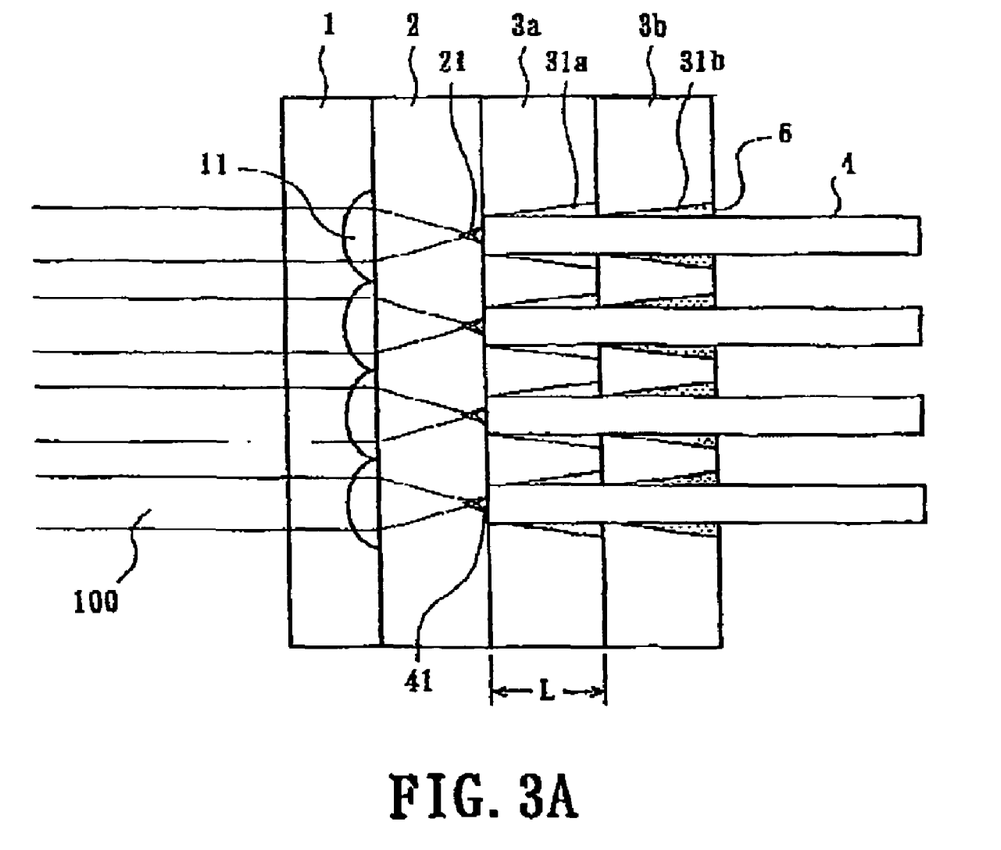
FIG. 3A shows a structure of an optical module of a first embodiment according to the present invention.

Referring now to FIG. 3A there is shown a first embodiment of an optical module according to the present invention. The optical module comprises a planar microlens array 1, a fitting transparent substrate 2, a first guide substrate 3a for optical fibers, a second guide substrate 3b for optical fibers, and a plurality of optical fibers 4. The planar microlens array 1 consists of a planar transparent substrate, in one surface thereof a plurality of circular microlenses it being formed and arrayed. The transparent substrate 2 includes a plurality of micro fitting recesses 21 formed and arrayed in one surface thereof. The first guide plate 3a includes a plurality of micro guide holes 31a opened therethrough. The second guide plate 3b includes a plurality of micro guide holes 31b opened therethrough. The end core portion of each optical fiber 4 is exposed convexly to form a micro fitting convex portion 41.

The transparent substrate 2 corresponds to the transparent substrate for adjusting a conjugate ratio of the optical module shown in FIG. 2, but the purpose thereof is not limited to only adjustment for a conjugate ratio. Therefore, the transparent substrate is herein referred to as "a fitting transparent substrate" in the meaning of the purpose for fitting optical fibers. The substrate of planar microlens array 1, the fitting transparent substrate 2, and the first and second guide substrate 3a, 3b are formed in such a manner that respective outer edge sizes thereof are the same.

In one example, a transparent substrate having an index of refraction $n_L=1.54$ is used as a planar microlens array, a plurality of circular microlenses 11 being formed in the surface of the transparent substrate by an ion exchange method. The focal length $f_L$ of a microlens 11 is 650 μm.

The fitting transparent substrate 2 may be fabricated in a following manner. First, an aluminosilicate glass plate is prepared, which has an index of refraction $n_h$=1.51, the surface thereof being ion exchanged by Ag. Next, a laser beam outputted from Nd:YAG laser is focused onto the surface of the aluminosilicate glass plate using a planar microlens array for processing. Focused beam spots form the micro fitting recesses 21 of substantially conical shape by heating. The inlet diameter and depth of each micro fitting recess are about 8 μm and about 4 μm, respectively, which are matched to the fitting convex portion 41 of the optical fiber's end.

According to the fabricating method described above, the positional relation between micro fitting recesses may be accurately determined, and then the center of a micro fitting recess 21 may be accurately aligned to the center of a corresponding microlens 11.

Figure 3B:
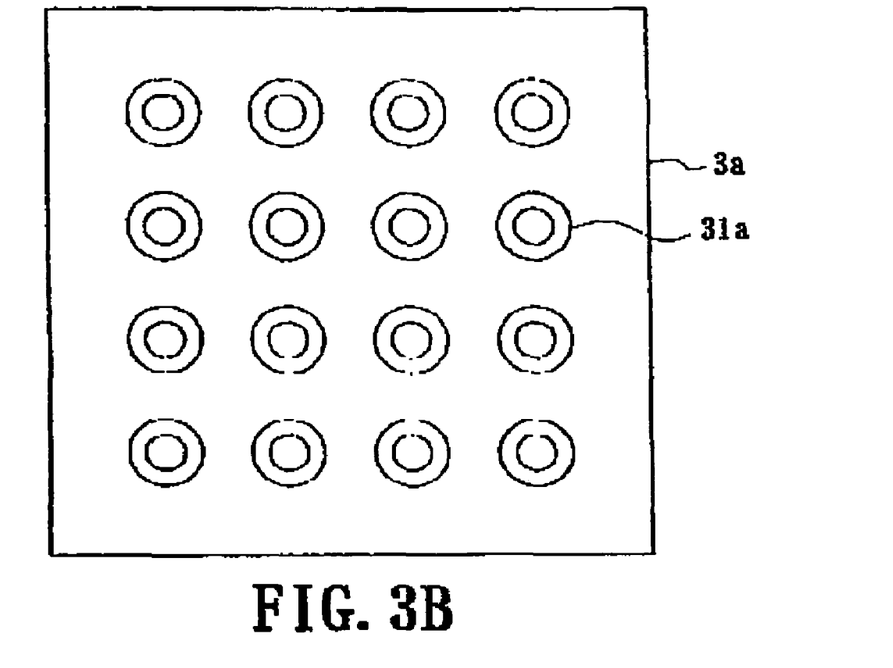
FIGS. 3B and 3C show top-plan views of first and second guide substrates, respectively, of the optical module of FIG. 3A.
Figure 3C:
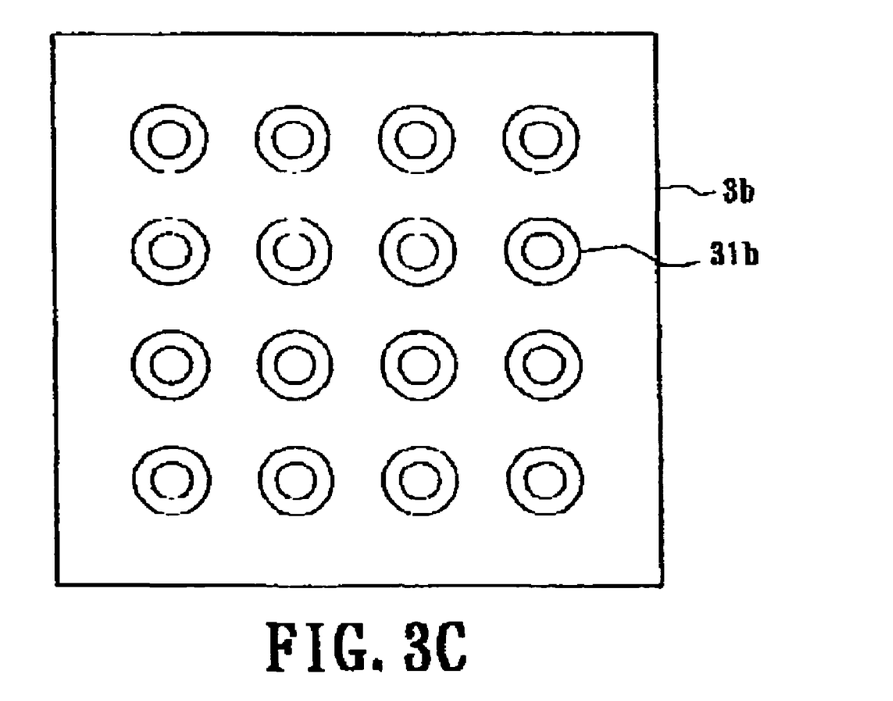

The first and second guide substrate 3a and 3b for optical fibers may be fabricated in a following manner. First, an aluminosilicate glass plate is prepared, which has a thickness of 300 μm, the surface thereof being ion exchanged by Ag. Next, a photomask pattern having a desired patterning is formed on one surface of the glass plate by means of a reducing image optical system comprising K,F excimer laser as a light source. Using this photomask pattern, tapered micro guide holes 31a and 31b are opened each thereof having an inlet of larger diameter and an outlet the diameter thereof is smaller than that of the inlet. The inlet and the outlet of micro guide holes 31a and 31b are circular. FIGS. 3B and 3C are top-plan views, viewed from the right side of FIG. 3A, of first and second guide substrates 3a and 3b, respectively, illustrating the circular inlets and outlets of respective micro guide holes 31a and 31b. The outlet diameter of a micro guide hole is selected to be 75 μm, and the taper angle is selected to be 6°, for example, considering the processing capability of the excimer laser and the workability of an optical fiber.

The micro guide holes 31a and 31b of the guide substrate 3a and 3b are formed in such a manner that the positional relation between micro guide holes in each guide substrate is accurate and the center of a micro guide hole in each guide substrate is precisely aligned to the center of a corresponding micro fitting recess 21 of the fitting transparent substrate 2.

The micro fitting convex portion 41 of an optical fiber's end is fabricated by dipping the end of an optical fiber 4 having a clad diameter of 75 μm in an etchant which has faster etching rate to a clad glass of optical fiber than that to a core glass thereof, e.g. in the mixture of hydrofluoric acid and ammonium fluoride. While the outer shape of a micro fitting convex portion 41 may be controlled by an etching condition, an substantially conical shape is selected herein in which the diameter of base portion thereof is 8.5 μm and the height is 3 μm, for example.

In the present embodiment described above, the thickness of the fitting transparent substrate 2 is $f_L \times n_h$, wherein $f_L$ is a focal length of microlens 11 and $n_h$ is an index of refraction of the substrate 2.

A method for assembling the optical module in the first embodiment will now be described with reference to FIGS. 4A–4D. As the microlenses 11 of the array substrate, the micro fitting recesses 21 of the fitting transparent substrate 2, and the first and second micro guide holes 31a, 31b of the guide substrate 3a, 3b are formed in a manner described above, the positional relation among these elements may be established with a high accuracy, as required. Therefore, the optical module of the present invention may be assembled by using a passive alignment technique based on a positional regulation without using an active alignment technique based on an optical regulation in which light is inputted to the optical system.

Figure 4A:
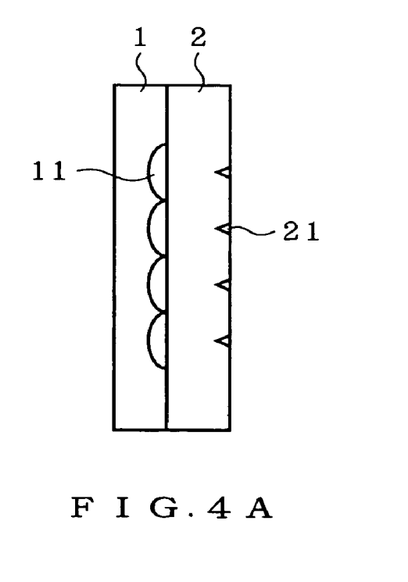
FIGS. 4A–4D illustrate a method for assembling the optical module in the first embodiment.

Also, as the respective outer edge sizes of the substrate of planar microlens array 1 and the fitting transparent substrate 2 including micro fitting recesses 21 are the same, respective microlenses 11 may be substantially aligned to respective micro fitting recesses 21 only by laying the fitting transparent substrate 2 on top of the substrate of planar microlens array 1 in such a manner that respective outer edges of these two substrates are matched. The superposition of these two substrates is finally regulated by monitoring the regulation using a microscope in such a manner that the center of the fitting recess 21 is aligned to the center of the circular microlens 11. It is enough for this regulation to be carried out with respect to several pairs of microlens and recess, because the positional relations between the microlenses and that between the fitting recesses are established accurately, respectively, as stated above. Then, adhesive (an index of refraction thereof is matched to that of these two substrates) is applied to the opposing surfaces of these two substrate 1 and 2 to be contacted, and these two substrates are adhered to each other as shown in FIG. 4A.

Figure 4B:
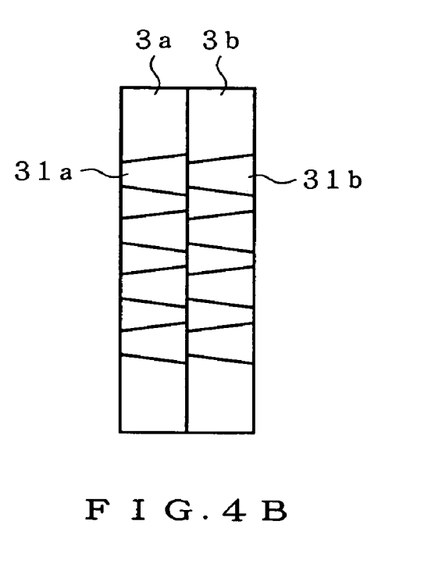

On the other hand, the first and second guide substrate 3a and 3b are stacked adhered to each other in such a manner that the positions of corresponding guide holes 31a and 31b are aligned coaxially as shown in FIG. 4B.

Figure 4C:
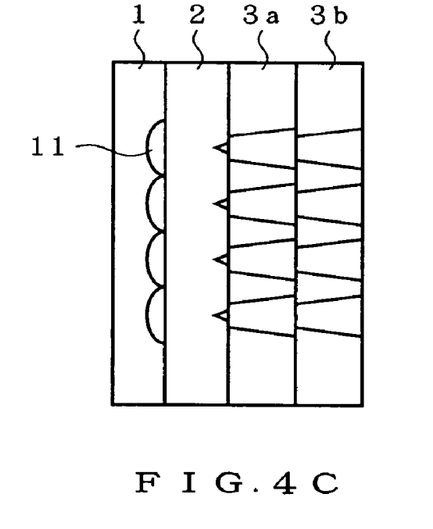

Next, a ultraviolet (UV)-curing adhesive (an index of refraction thereof is matched to that of these two substrates 2 and 3a) is applied to the recess-formed surface of the fitting transparent substrate 2, and then the substrate 2 is aligned and temporarily fixed by means of a jig to the guide substrates 3a and 3b adhered to each other in advance.

Next, a UV-curing adhesive 6 (an index of refraction thereof is matched to that of the substrate 2) is applied into the micro guide holes 31b of the guide plate 3b, and then an optical fiber 4 is inserted into the guide hole 31b with the micro fitting convex portion 41 thereof being at the head. The optical fiber 4 passes through the micro guide hole 31a of the guide plate 3a to fit the micro convex portion 41 to the micro fitting recess 21 of the transparent substrate 2.

A part of UV-curing adhesive 6 applied to the micro guide hole 31b is transported to the guide hole 31a of the guide substrate 3a and the fitting recess 21 of the transparent substrate 2.

Figure 4D:
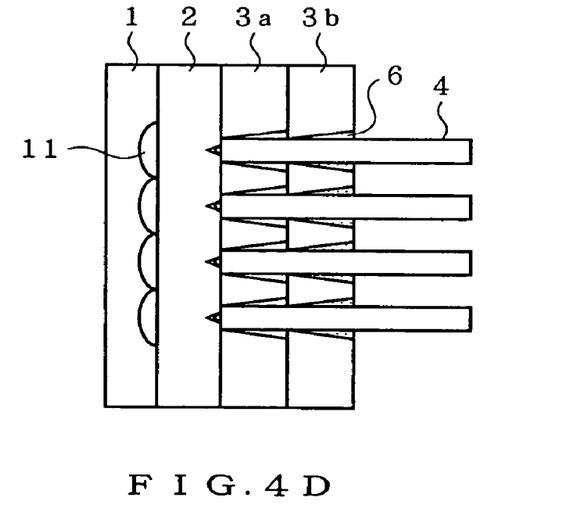

Last, the stacked guide substrates 3a and 3b are adhered to the fitting transparent substrate 2 by eradiating UV ray and then optical fibers 4 are fixed.

As described above, the end core portion of the optical fiber 4 may be guided and aligned to the optical axis of the microlens 11 only by fitting the convex portion 41 thereof to the recess 21 of the substrate 2. The optical fibers 4 are positioned perpendicularly to the transparent substrate 2, because the optical fiber 4 are held at the outlets of the micro guide holes 31a and 31b of the two guide substrates.

According to the optical module assembled described above, it may be confirmed that collimated light beams 100 are outputted from the planar microlens array 1 as shown in FIG. 3A when monitoring the light outputted from the planar microlens array 1 by means of an infrared CCD camera.

In order to position optical fibers perpendicularly to the fitting transparent substrate 2, a large thickness L of the first guide substrate 3a is preferable. In this case, an array of guide holes are required to be formed in a thick substrate. When the formation of guide holes in a thick substrate is difficult due to the condition of a laser beam machining, it is preferable that a plurality of (more than two) guide substrates are stacked and adhered.

The stacked and adhered guide substrates may be easily fabricated in a following manner. That is, a plurality of guide substrates each having guide holes are stacked and aligned by inserting pins or the like into more than opposing two guide holes to match the position thereof coaxially, the pins or the like being easily inserted because the guide hole is tapered. The guide substrate are subsequently adhered by UV-curing adhesive.

While a plurality of guide substrates are stacked and adhered with their opposing guide holes are positioned coaxially in order to arrange all of the optical fibers perpendicularly to the fitting transparent substrate, a plurality of guide substrates may be stacked and adhered with relatively being shifted each other so that all of the fibers are inclined in a predetermined angle with respect to the fitting transparent substrate. An embodiment like this will now be described.

Second Embodiment

Figure 5:
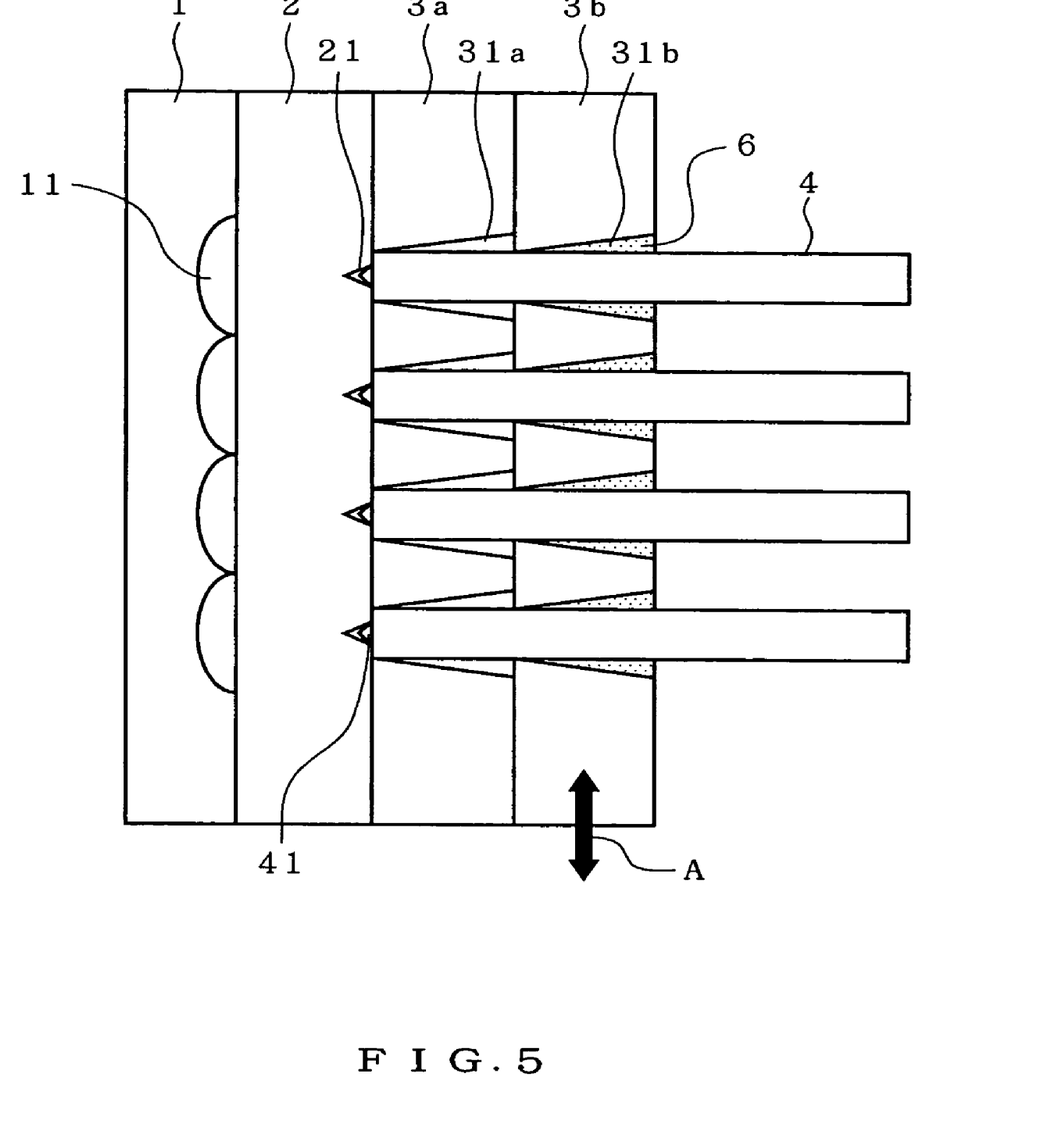
FIG. 5 shows a structure of an optical module of a second embodiment according to the present invention.

Referring now to FIG. 5, there is shown a second embodiment of an optical module according to the present invention. According to the second embodiment, the fitting transparent guide substrates 3a and 3b stacked to each other are aligned and temporally fixed by means of a jig to the micro recess-formed surface of the fitting transparent substrate 2 on which UV-curing adhesive is applied, an index of refraction of the adhesive being matched to that of the substrates.

Next, UV-curing adhesive 6 (an index of refraction thereof is matched to that of substrate 2) is applied into the micro guide holes 31b of the guide plate 3b, and then an optical fiber 4 is inserted into the guide hole 31b with the micro fitting convex portion 41 being at the head. The optical fiber 4 passes through the micro guide hole 31a of the guide plate 3a to fit the micro convex portion 41 to the micro recess 21 of the transparent substrate 2. The position of the guide substrate 3b is finely adjusted by means of an adjusting mechanism (not shown) in a direction shown by an arrow A in FIG. 5 to regulate/the angles of all the optical fibers to be inclined with respect to the fitting transparent substrate 2.

Last, the stacked guide substrate 3a and 3b are adhered to the fitting transparent substrate 2 by eradiating UV ray and then optical fibers 4 are fixed.

Third Embodiment

While the planar microlens array in which microlenses are formed in one side to which the fitting transparent substrate is opposed, the microlenses may be formed in the other side of the planar microlens array.

Figure 6:
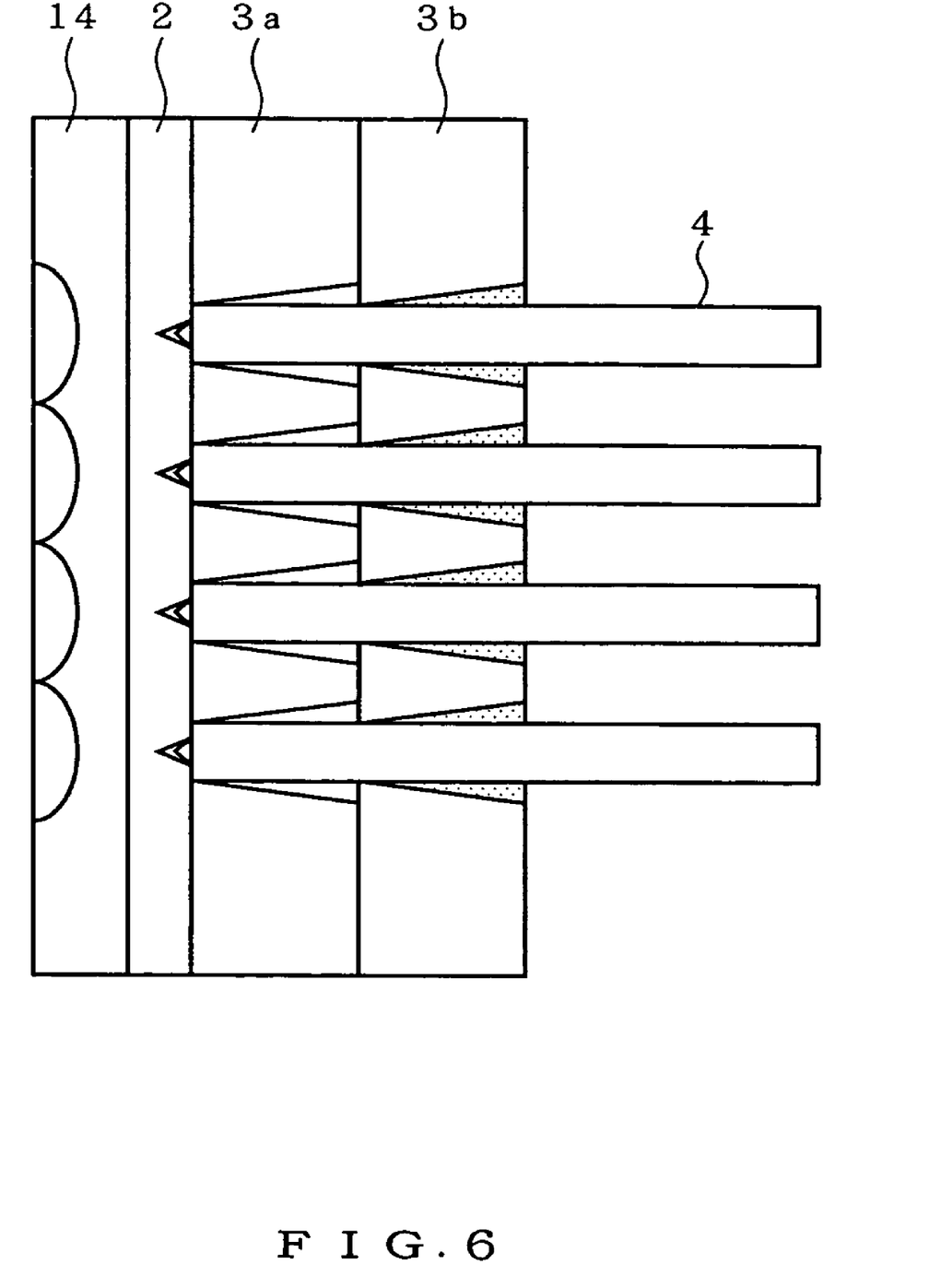
FIG. 6 shows a structure of an optical module of a third embodiment according to the present invention.

FIG. 6 shows such an embodiment of an optical module. The microlenses 11 of the planar microlens array 14 are formed on a side which is opposite to a side facing to the fitting transparent substrate 2. As the residual structure thereof is the same as in the first and second embodiments, the further explanation will not be needed.

Fourth Embodiment

The first and second embodiments have directed to an optical module of a type having a fitting transparent substrate shown in FIG. 2. The present invention is also applicable to an optical module of a type shown in FIG. 1. Such an embodiment of an optical module will now be described.

Figure 7:
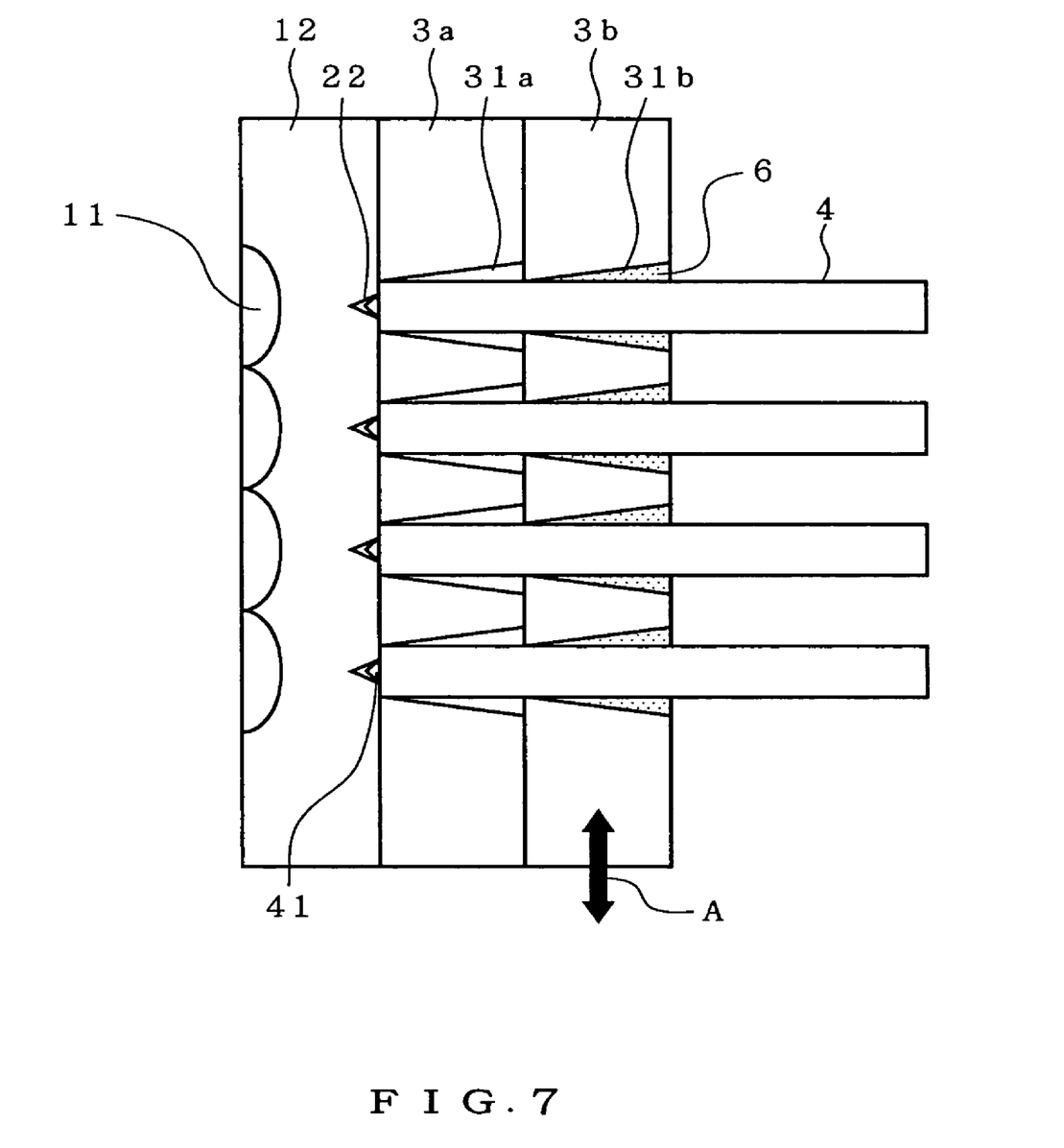
FIG. 7 shows a structure of an optical module of a fourth embodiment according to the present invention.

Referring to FIG. 7, there is shown an optical module without a fitting transparent substrate. This optical module resembles to that in which a fitting transparent substrate is not provided in FIG. 3A. The optical module comprises a planar microlens array 12, a first guide substrate 3a for optical fibers, a second guide substrate 3b for optical fibers, and a plurality of optical fibers 4. The planar microlens array includes a plurality of micro fitting recesses 22 formed in one surface thereof and a plurality of micro fitting recesses 22 formed in the other surface thereof. The first and second guide substrates 3a and 3b are the same as in the first embodiment. The first and second guide substrates 3a and 3b are stacked and adhered to each other in advance such that the positions of opposing guide holes are aligned coaxially.

Next, UV-curing adhesive (an index of refraction thereof is matched to that of these two substrates 12 and 3a) is applied to the recess-formed surface of the fitting transparent substrate 12, and then the substrate 12 is aligned and temporarily fixed by means of a jig to the guide substrates 3a and 3b adhered in advance.

Next, UV-curing adhesive (an index of refraction thereof is matched to that of the substrate 12) is applied into the micro guide holes 31b of the guide plate 3b, and then an optical fiber 4 is inserted into the guide hole 31b with the micro fitting convex portion 41 being at the head. The optical fiber 4 passes through the micro guide hole 31a of the guide plate 3a to fit the micro convex portion 41 to the micro fitting recess 22 of the planar microlens array 12. The position of the guide substrate 3b is finely adjusted by means of an adjusting mechanism (not shown) in a direction shown by an arrow A to regulate the angles of all the optical fibers to be inclined with respect to the fitting transparent substrate 2.

Last, the stacked guide substrate 3a and 3b are adhered to the fitting transparent substrate 2 by eradiating UV ray and then optical fibers 4 are fixed.

While the invention has been described with reference to one or more embodiments, the present invention is not limited to these embodiments. Those skilled in the art will understand that various modifications may be made without departing from the scope of the present invention.

For example, microlenses may be formed not only on one side but also both sides of the planar microlens array. Also, a plurality of planar microlens arrays may be stacked and adhered.

INDUSTRIAL APPLICABILITY

According to the present invention, the angles of the optical fibers to be inclined with respect to the planar microlens array may be regulated at the same time when respective optical axes of the microlenses and respective optical fibers are passively aligned The optical module of the present invention comprises a planar microlens array having a plurality of microlenses formed in one surface thereof, a planar fitting transparent substrate having a plurality of micro fitting recesses formed in one surface thereof, a planar first guide plate having a plurality of micro guide holes opened therethrough, a planar second guide plate having a plurality of micro guide holes opened therethrough, and a plurality of optical fibers each end thereof having a micro fitting convex portion.

The invention claimed is:

1. An optical module comprising:
   a planar microlens array having a plurality of microlenses formed in at least one surface thereof;
   a planar fitting transparent substrate, one surface thereof being adhered to one surface of the planar microlens array, and a plurality of micro fitting recesses being formed in the other surface thereof with the center of each recess being substantially aligned to the center of each microlens; and a plurality of guide substrates for optical fibers stacked and adhered to each other along opposing surfaces of the guide substrates, the stacked guide substrates being adhered to the other surface of the fitting transparent substrate, each of the guide substrates having a plurality of tapered micro guide holes opened therethrough with opposing guide holes being substantially aligned to each other, and each guide hole being substantially aligned to a corresponding recess, wherein the stacked guide substrates are configured to be in contact with each optical fiber along respective multiple displaced annular rings formed by the opposing guide holes.

2. The optical module of claim 1 further comprising a plurality of optical fibers each having a micro fitting convex portion consisting of an exposed end core portion of each of the optical fibers, wherein each of the optical fibers is inserted through the opposing guide holes to be fitted into the corresponding recess.

3. The optical module of claim 2 wherein the guide substrates are stacked in such a manner that the opposing micro guide holes are coaxially positioned to cause all of the optical fibers to be perpendicular to the fitting transparent substrate.

4. The optical module of claim 2 wherein the optical guide substrates are stacked in such a manner that the opposing guide holes are relatively shifted to cause all of the fibers to be inclined to the fitting transparent substrate.

5. An optical module comprising:

a planar microlens array having a plurality of microlenses formed in one surface thereof and a plurality of micro fitting recesses formed in the other surface thereof with the center of each recess being substantially aligned to the center of each microlens; and a plurality of guide substrates for optical fibers stacked and adhered to each other along opposing surfaces of the guide substrates, the stacked guide substrates being adhered to the other surface of the planar microlens array, each of the guide substrates having a plurality of tapered micro guide holes opened therethrough with opposing guide holes being substantially aligned to each other, and each guide hole being substantially aligned to a corresponding recess, wherein the stacked guide substrates are configured to be in contact with each optical fiber along respective multiple displaced annular rings formed by the opposing guide holes.

6. The optical module of claim 5 further comprising a plurality of optical fibers each having a micro fitting convex portion consisting of an exposed end core portion of each of optical fibers, wherein each of the optical fibers is inserted through the opposing guide holes to be. fitted into the corresponding recess.

7. The optical module of claim 6 wherein the guide substrates are stacked in such a manner that the opposing micro guide holes are coaxially positioned to cause all of the optical fibers to be perpendicular to the planar microlens array.

8. The optical module of claim 6 wherein the optical guide substrates are stacked in such a manner that the opposing guide holes are relatively shifted to cause all of the fibers to be inclined to the planar microlens array.

9. A method for assembling an optical module comprising the steps of:

preparing a planar microlens array having a plurality of microlenses formed in at least one surface thereof;

adhering one surface of the planar microlens array to one surface of a planar fitting transparent substrate, the planar fitting transparent substrate having a plurality of micro fitting recesses formed in the other surface thereof, in such a manner that the center of each recess is substantially aligned to the center of each microlens, stacking and adhering a plurality of guide substrates for optical fibers to each other along opposing surfaces of the guide substrates, each of the guide substrates having a plurality of micro guide holes opened therethrough with each guide hole being substantially aligned to the center of a corresponding recess; and adhering the stacked guide substrates to the other surface of the fitting transparent substrate, wherein the stacked guide substrates are configured to be in contact with each optical fiber along respective multiple displaced annular rings formed by opposing micro guide holes of the respective guide substrates.

10. The method of claim 9 wherein the guide substrates are stacked and adhered in such a manner that the opposing micro guide holes of the respective guide substrates are coaxially positioned.

11. The method of claim 9 wherein the guide substrates are stacked and adhered in such a manner that the opposing micro guide holes of the respective guide substrates are relatively shifted.

12. The method of claim 10 or 11 further comprising the steps of:

preparing a plurality of optical fibers each having a micro fitting convex portion consisting of an exposed end core portion, and inserting the optical fibers into the micro guide holes of the guide substrates, fitting the micro convex portions thereof to the micro recesses of the planar fitting transparent substrate, and adhering the optical fibers to the micro guide holes.

13. A method for assembling an optical module comprising the steps of:

preparing a planar microlens array having a plurality of microlenses formed in one surface thereof and a plurality of micro fitting recesses formed in the other surface thereof with the center of each recess being substantially aligned to the center of each microlens;

stacking and adhering a plurality of guide substrates for optical fibers to each other along opposing surfaces of the guide substrates, each of the guide substrates having a plurality of micro guide holes opened therethrough with each guide hole being substantially aligned to the center of a corresponding recess; and adhering the stacked guide substrates to the other surface of the planar microlens array, wherein the stacked guide substrates are configured to be in contact with each optical fiber along respective multiple displaced annular rings formed by opposing micro guide holes of the respective guide substrates.

14. The method of claim 13, wherein the guide substrates are stacked and adhered in such a manner that the opposing micro guide holes of the respective guide substrates are coaxially positioned.

15. The method of claim 13 wherein the guide substrates are stacked and adhered in such a manner that the opposing micro guide holes of the respective guide substrates are relatively shifted.

16. The method of claim 14 or 15 further comprising the steps of:
preparing a plurality of optical fibers each having a micro fitting convex portion consisting of an exposed end core portion, and
inserting the optical fibers into the micro guide holes of the guide substrates, fitting the micro convex portions thereof to the micro recesses of the planar microlens array, and adhering the optical fibers to the micro guide holes.

* * * * *